United States Patent
Worrall et al.

(10) Patent No.: US 9,055,544 B2
(45) Date of Patent: Jun. 9, 2015

(54) METHODS OF SETTING MAXIMUM OUTPUT POWER FOR USER EQUIPMENT AND REPORTING POWER HEADROOM, AND THE USER EQUIPMENT

(75) Inventors: Chandrika Worrall, Newbury (GB); Matthew Baker, Canterbury (GB); Patrick Charriere, Letcombe Regis (GB); Fang-Chen Cheng, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 453 days.

(21) Appl. No.: 13/279,556

(22) Filed: Oct. 24, 2011

(65) Prior Publication Data

US 2012/0127933 A1    May 24, 2012

Related U.S. Application Data

(60) Provisional application No. 61/409,343, filed on Nov. 2, 2010.

(51) Int. Cl.
*H04W 4/00* (2009.01)
*H04W 52/36* (2009.01)
*H04W 52/14* (2009.01)

(52) U.S. Cl.
CPC .......... *H04W 52/367* (2013.01); *H04W 52/146* (2013.01); *H04W 52/365* (2013.01); *Y02B 60/50* (2013.01)

(58) Field of Classification Search
USPC .................. 370/328, 329, 338, 252, 310, 343
See application file for complete search history.

(56) References Cited

U.S. PATENT DOCUMENTS

| 7,016,690 | B2 * | 3/2006 | Corson et al. ............. 455/456.1 |
| 7,194,282 | B2 * | 3/2007 | Jarvisalo et al. ............. 455/522 |
| 7,599,320 | B2 * | 10/2009 | Ratasuk et al. ............. 370/318 |
| 7,917,164 | B2 * | 3/2011 | Rao ............................. 455/522 |
| 8,428,521 | B2 * | 4/2013 | Luo et al. ...................... 455/69 |
| 8,442,572 | B2 * | 5/2013 | Borran et al. ............... 455/522 |
| 8,447,344 | B2 * | 5/2013 | Ratasuk et al. ............. 455/522 |
| 8,462,705 | B2 * | 6/2013 | Kim et al. .................... 370/328 |

(Continued)

OTHER PUBLICATIONS

3GPP: "3rd Generation Partnership Project; Technical Specification Group Radio Access Network; Evolved Universal Terrestrial Radio Access (E-UTRA); User Equipment (UE) radio transmission and reception; (Release 10)", 3GPP Draft; R4-103980 3GPP TR 36.807 V.0.2.0 (Oct. 2010); 3rd Generation Partnership Project (3GPP), Mobile Competence Centre; 650 Route des Lucioles; F-06921 Sophia-Antipolis Cedex; France, vol. RAN WG4, No. Xian; 20101011, Oct. 18, 2010 (Oct. 18, 2010), XP050503627.

(Continued)

*Primary Examiner* — Brian O'Connor
(74) *Attorney, Agent, or Firm* — Harness, Dickey & Pierce, P.L.C.

(57) ABSTRACT

One embodiment of the method includes defining, at the user equipment, a range for the maximum output power. The range includes a maximum value and a minimum value. The minimum value is based on a maximum power signalled by a base station, a power class of the user equipment, a maximum power reduction permitted, an additional maximum power reduction permitted, a reduction term dependent on transmission bandwidth, and a power management term. The method further includes setting, at the user equipment, the maximum output power within the defined range.

19 Claims, 3 Drawing Sheets

(56) References Cited

U.S. PATENT DOCUMENTS

| | | | | |
|---|---|---|---|---|
| 8,565,205 | B2* | 10/2013 | Ho et al. | 370/338 |
| 8,583,160 | B2* | 11/2013 | Gaal et al. | 455/522 |
| 8,867,440 | B2* | 10/2014 | Ho et al. | 370/328 |
| 2006/0209721 | A1* | 9/2006 | Mese et al. | 370/254 |
| 2011/0158117 | A1* | 6/2011 | Ho et al. | 370/252 |
| 2012/0082046 | A1* | 4/2012 | Ho et al. | 370/252 |

OTHER PUBLICATIONS

Qualcomm Incorporated: "PA Headroom Report for Rel. 10", 3GPP Draft; R4-103290, 3rd Generation Partnership Project (3GPP), Mobile Competence Centre; 650, Route des Lucioles; F-06921 Sophia-Antipolis Cedex; France, vol. RAN WG4, No. Madrid, Spain; 20100823, Aug. 19, 2010 (Aug. 19, 2010), XP050454341.

International Search Report and Written Opinion dated Jun. 21, 2012 issued in corresponding International Application No. PCT/US2011/058741.

3GPP TS 36.101, V10.0.0 (Oct. 2010), "3rd Generation Partnership Project . . . ", (Release 10).

3GPP TS 36.101, V10.4.0 (Sep. 2011), "3rd Generation Partnership Project . . . ", (Release 10).

3GPP TS 36.321, V9.3.0 (Jun. 2010), "3rd Generation Partnership Project . . . ", (Release 9).

3GPP TS 36.321, V10.3.0 (Sep. 2011), "3rd Generation Partnership Project . . . ", (Release 10).

Notice of Reason for Refusal for corresponding Japanese Application No. 2013-537762 dated Apr. 18, 2014 and English translation thereof.

"3GPP TS 36.101 V10.0.0 (Oct. 2010)," Oct. 2010, [Searched on Apr. 18, 2014], URL: http://www.3gpp.org/ftp/Specs/archive/36_series/36.101-a00.zip.

"Details on PHR Report," Aug. 2010, 3GPP TSG-RAN WG1 #62, R1-104791, [Searched on Apr. 18, 2014], URL: http://www.3gpp.org/ftp/tsg_ran/WG1_RL1/TSGR1_62/Docs/R1-104791.zip.

Notice of Preliminary Rejection for corresponding Korean Application No. 10-2013-7013157 dated Dec. 12, 2014 and English translation thereof.

Decision of Rejection for corresponding Japanese Application No. 2013-537762 dated Aug. 20, 2014 and English translation thereof.

* cited by examiner

METHODS OF SETTING MAXIMUM OUTPUT POWER FOR USER EQUIPMENT AND REPORTING POWER HEADROOM, AND THE USER EQUIPMENT

PRIORITY INFORMATION

This application claims priority under 35 U.S.C. 119 to Provisional Application No. 61/409,343, filed Nov. 2, 2010; the entire contents of which are hereby incorporated by reference.

BACKGROUND OF THE INVENTION

A user equipment (UE) is required to meet overall regional Specific Absorption Rate (SAR) transmit power requirements regardless of whether single or dual/multiple transmission using different radio access technologies (RATs) is supported. Regional SAR requirements impose restrictions on the maximum RF power density close to the UE. In the case of dual/multiple transmission UEs, the implications of this restriction on the transmit power are dependent on various factors such as the number and location of the antennas (whether two antennas are used, the distance between them, etc.) and the form factor of the UE. In some situations this can place additional limits on the transmission powers of one or more air interfaces when they are operating concurrently.

Further, when there is multiple transmission on different RATs, inter-modulation products may arise that cause interference on neighboring carriers. This can likewise place constraints on the transmission powers on one or more RATs when they are operating concurrently.

A problem that arises from such power reductions is that there is no standard mechanism of informing the network (scheduler) of the reduction of transmission power due to the dual/multiple transmission. Not knowing up-to-date information of available transmission power at the UE, the network may schedule the UE for higher transmission power which the UE may fail to deliver, hence impacting system performance. In addition, there is a possibility for mismatch between network and the UE on power control, which also leads to inaccuracy in channel estimation at the network. This also results in scheduling inaccuracy, hence reduction of system performance.

A further problem is that there is no defined way to specify the allowed reductions in transmission power, with the result that UEs may choose to reduce their transmission power by arbitrary amounts, resulting in unpredictable performance.

There is no standard compliant mechanism for providing transmission power information to the network (scheduler) taking into account the power reduction due to the dual/multiple transmission.

A conventional mechanism to trigger the transmission of power headroom reporting (PHR) to the network exists. However, the PHR only provides information about the difference between nominal UE maximum transmit power, $P_{CMAX}$, and the estimated power of UL transmission. Therefore, PHR does not convey information to the network of the cause of power reduction or the amount of power reduction due to, for example, dual/multiple transmission. Maximum output power of the UE, $P_{CMAX}$, is defined as a value range in the current LTE specification (Rel-8/9 LTE). The UE sets $P_{CMAX}$ to a value within the value range. The value range depends on UE power class, the maximum transmit power signalled by the network, $P_{EMAX}$, maximum power reduction permitted based on modulation and transmit bandwidth configuration, MPR, additional maximum power reduction permitted based on additional requirements for uplink transmission to the network (e.g., eNodeB), A-MPR, and a reduction term dependent on the transmission bandwidth, $\Delta T_C$. $P_{CMAX}$, the value range and the above discussed parameters are defined in TS 36.101 V10.0.0.

The UE is allowed to set its maximum output power $P_{CMAX}$. The configured maximum output power $P_{CMAX}$ is set within the following bounds:

$$P_{CMAX\_L} \leq P_{CMAX} \leq P_{CMAX\_H} \tag{1}$$

where $$P_{CMAX\_L} = \text{MIN}\{P_{EMAX} - \Delta T_C, P_{PowerClass} - \text{MPR} - \text{A-MPR} - \Delta T_C\} \tag{2}$$

$$P_{CMAX\_H} = \text{MIN}\{P_{EMAX}, P_{PowerClass}\} \tag{3}$$

$P_{EMAX}$ is the value broadcast by the network in system information. $P_{EMAX}$ takes into account the inter-cell interference co-ordination.

$P_{PowerClass}$ is the maximum UE power specified in the standard and available to the UE from tables stored in the UE.

MPR and A-MPR are specified in the standard and available from tables stored in the UE. MPR depends on the modulation and transmit bandwidth configuration, while A-MPR depends on additional requirements for uplink transmission to the network (e.g., eNodeB). For example A-MPR depends on frequency band and resource region allocated for the UL transmission to the eNodeB.

$\Delta T_C$ is defined in the standard and depends on the frequency band for uplink transmission.

Radio resource control (RRC) controls power headroom reporting by configuring two timers periodicPHR-Timer and prohibitPHR-Timer and by signalling a threshold value dl-PathlossChange. The PHR is triggered if the following criterion is met:

prohibitPHR-Timer expires or has expired and the path loss has changed more than dl-PathlossChange dB since the last transmission of a PHR when UE has up link (UL) resources for new transmission;

periodicPHR-Timer expires;

upon configuration or reconfiguration of the power headroom reporting functionality by upper layers, which is not used to disable the function.

SUMMARY OF THE INVENTION

At least one example embodiment relates to a method of setting a maximum output power for user equipment.

One embodiment of the method includes defining, at the user equipment, a range for the maximum output power. The range includes a maximum value and a minimum value. The minimum value is based on a maximum power signaled by a base station, a power class of the user equipment, a maximum power reduction permitted, an additional maximum power reduction permitted, a reduction term dependent on transmission bandwidth, and a power management term. The method further includes setting, at the user equipment, the maximum output power within the defined range.

In one embodiment, the maximum power reduction permitted is based on modulation and transmit bandwidth configuration, and the additional maximum power reduction permitted is based on additional requirements for uplink transmission to the base station.

In one embodiment, the power management term represents a power reduction due to transmission on different radio access technologies by the user equipment.

In another embodiment, the power management term represents a power reduction due to transmission on different radio access technologies by the user equipment.

In a further embodiment, the minimum value is selected as a minimum one of:

$P_{EMAX}-\Delta T_C$, $P_{PowerClass}-MPR-A-MPR-\Delta T_C$, $P_{PowerClass}-P_D-\Delta T_C$ where $P_{EMAX}$ is the maximum power signaled by a base station, $P_{PowerClass}$ is the power class of the user equipment, MPR is the maximum power reduction permitted, A-MPR is the additional maximum power reduction permitted, $\Delta T_C$ is the reduction term dependent on transmission bandwidth, and $P_D$ is the power management term.

Another embodiment relates to a method of reporting power headroom.

In one embodiment, the method includes setting, at a user equipment, a maximum output power within a defined range. The defined range includes a maximum value and a minimum value. The minimum value is based on a maximum power signaled by a base station, a power class of the user equipment, a maximum power reduction permitted, an additional maximum power reduction permitted, a reduction term dependent on transmission bandwidth, and a power management term. The method further includes sending, by the user equipment, a power headroom report if a triggering event occurs. The power headroom report includes information related to the set maximum output power.

In one embodiment, the maximum power reduction permitted is based on modulation and transmit bandwidth configuration, and the additional maximum power reduction permitted is based on additional requirements for uplink transmission to the base station.

In another embodiment, the power management term represents a power reduction due to transmission on different radio access technologies by the user equipment.

In a further embodiment, the power management term represents a power reduction due to transmission on different radio access technologies by the user equipment.

In one embodiment, the minimum value is selected as a minimum one of:

$P_{EMAX}-\Delta T_C$, $P_{PowerClass}-MPR-A-MPR-\Delta T_C$, $P_{PowerClass}-P_D-\Delta T_C$ where $P_{EMAX}$ is the maximum power signaled by a base station, $P_{PowerClass}$ is the power class of the user equipment, MPR is the maximum power reduction permitted, A-MPR is the additional maximum power reduction permitted, $\Delta T_C$ is the reduction term dependent on transmission bandwidth, and $P_D$ is the power management term.

In another embodiment, at least one trigger event includes conditions of expiration of a timer, and a value of the management term has changed by greater than a threshold since a previous power headroom report was sent. In one embodiment, the method may further include resetting the timer after sending the power headroom report.

In a further embodiment, at least one trigger event includes conditions of expiration of a timer, and a value of the set maximum output power has changed by greater than a threshold since a previous power headroom report was sent because of a change in the management term. In one embodiment, the method may further include resetting the timer after sending the power headroom report.

In one embodiment, the sending sends the set maximum power output.

In one embodiment, the sending sends the power management term.

In one embodiment, the sending sends an amount of an actual power reduction due to the power management term.

In one embodiment, the sending sends an indication of a reason for a power reduction at the user equipment.

At least one embodiment relates to a user equipment employing one or more of the above described methods.

At least one embodiment relates to a method of scheduling uplink transmission.

In one embodiment, the method includes receiving, at a base station, a power headroom report from user equipment. The power headroom report includes information related to a maximum output power set at the user equipment. The maximum output power is set within a defined range. The defined range includes a maximum value and a minimum value. The minimum value is based on a maximum power signaled by the base station, a power class of the user equipment, a maximum power reduction permitted, an additional maximum power reduction permitted, a reduction term dependent on transmission bandwidth, and a power management term. The method further includes scheduling an uplink transmission by the user equipment based on the received power headroom report. In one embodiment, the receiving receives at least one of the set maximum output power, the power management term, and an amount of an actual power reduction due to the power management term.

In another embodiment, the receiving receives an indication of a reason for a power reduction at the user equipment.

At least one embodiment relates to a base station employing one of the above described embodiments.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
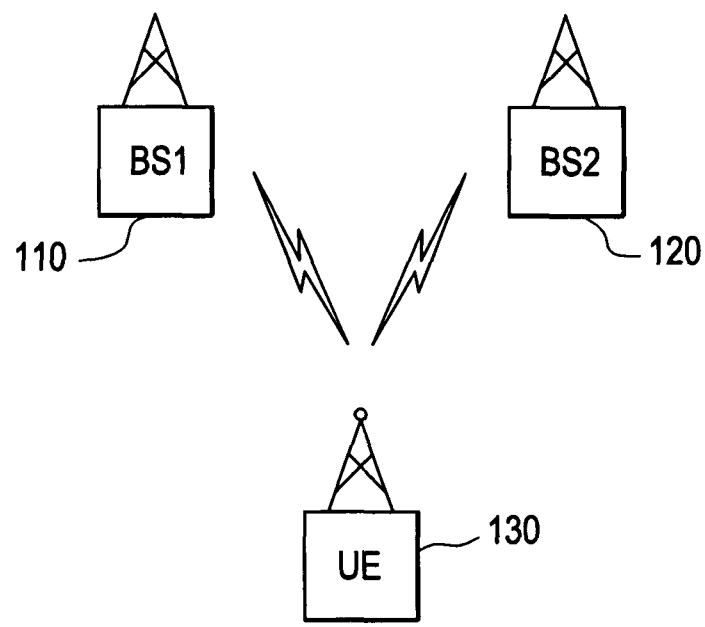
FIG. 1 illustrates a portion of a wireless communication system according to an embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail'. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a mobile user, mobile station, mobile terminal, user, subscriber, wireless terminal, terminal, and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs (eNodeB), access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Architecture

FIG. 1 illustrates a portion of a wireless communication system according to an embodiment. As shown, the system may include base stations such as base stations 110 and 120 associated with different radio access technologies (RATs). For example, base station 110 may be associated with a different RAT than the RAT to which base station 120 is associated. Examples of RATs include Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); and 3$^{rd}$ Generation Partnership Project Long Term Evolution (3GPP LTE).

Still further, base stations 110 and 120 may have the same or overlapping coverage areas. UEs such as UE 130 may communicate with one or both of the base stations 110, 120. While FIG. 1 represents a situation with two RATs, embodiments are not limited to two RATs, and are applicable to any number of RATs.

Figure 2:
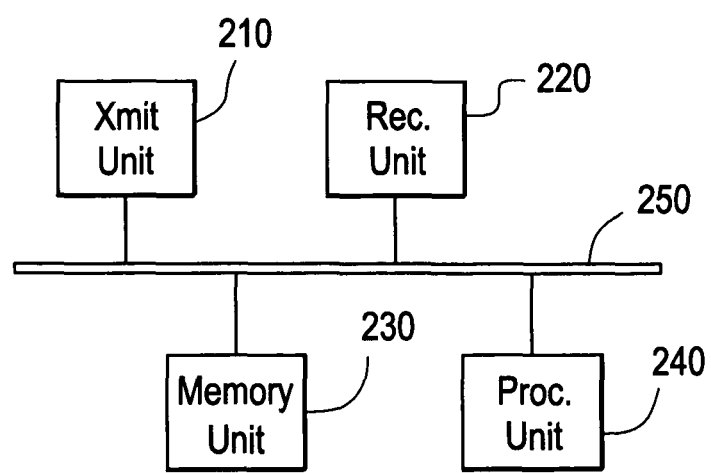
FIG. 2 is a diagram illustrating an example structure of a wireless device.

FIG. 2 is a diagram illustrating an example structure of a user equipment such as UE 130 shown in FIG. 1. The UE 130 may include, for example, a transmitting unit 210, a receiving unit 220, a memory unit 230, a processing unit 240, and a data bus 250.

The transmitting unit 210, receiving unit 220, memory unit 230, and processing unit 240 may send data to and/or receive data from one another using the data bus 250. The transmitting unit 210 is a device that includes hardware and any necessary software for transmitting wireless signals including, for example, data signals, control signals, and signal strength/quality information via one or more wireless connections to other wireless devices (e.g., base stations).

The receiving unit 220 is a device that includes hardware and any necessary software for receiving wireless signals including, for example, data signals, control signals, and signal strength/quality information via one or more wireless connections from other wireless devices (e.g., base stations).

The memory unit 230 may be any storage medium capable of storing data including magnetic storage, flash storage, etc.

The processing unit 240 may be any device capable of processing data including, for example, a microprocessor configured to carry out specific operations based on input data, or capable of executing instructions included in computer readable code.

For example, the processing unit 240 is capable of implementing the methods described in detail below.

Operation

Embodiments for setting a maximum output power for user equipment and for reporting power headroom will now be described.

Figure 3:
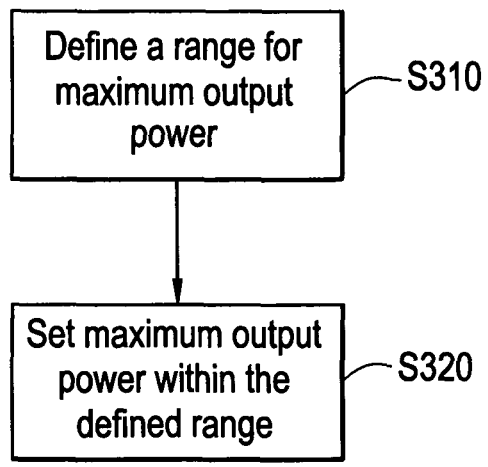
FIG. 3 illustrates a flow chart of a method of setting maximum output power.

FIG. 3 illustrates a flow chart of a method of setting maximum output power. As shown, in step S310, the UE 130 (e.g., the processing unit 240) defines a range for maximum output power $P_{CMAX}$. The range may be represented as follows:

$$P_{CMAX\_L} \leq P_{CMAX} \leq P_{CMAX\_H} \quad (4)$$

where $P_{CMAX\_L}$ is the minimum value for the maximum output power $P_{CMAX}$, and $P_{CMAX\_H}$ is the maximum value for the maximum output power $P_{CMAX}$. The minimum and maximum values are defined as:

$$P_{CMAX\_L} = \mathrm{MIN}\{P_{EMAX} - \Delta T_C, P_{PowerClass} - \mathrm{MPR-A-MPR} - \Delta T_C, P_{PowerClass} - P_D - \Delta T_C\} \quad (5)$$

$$P_{CMAX\_H} = \mathrm{MIN}\{P_{EMAX}, P_{PowerClass}\} \quad (6)$$

where $P_{EMAX}$ is the value broadcast by the network in system information. $P_{EMAX}$ takes into account the inter-cell interference co-ordination.

$P_{PowerClass}$ is the maximum UE power specified in the standard and available to the UE from tables stored in the UE.

MPR and A-MPR are specified in the standard and available from tables stored in the UE. MPR depends on the modulation and transmit bandwidth configuration, while A-MPR depends on additional requirements for uplink transmission to the network (e.g., eNodeB). For example A-MPR depends on frequency band and resource region allocated for the uplink (UL) transmission to the eNodeB.

$\Delta T_C$ is defined in the standard and depends on the frequency band for uplink transmission.

$P_D$ is a power management term.

In one embodiment, the power management term $P_D$ may define the maximum allowed power reduction due to dual/multiple transmission and is independent to the bandwidth of resource allocation. The value for $P_D$ may be defined for different combinations of dual/multiple transmission, operating frequency bands. As such, the value for $P_D$ may be empirically determined and accessible from tables stored in the memory unit 230.

Another alternative is to signal the value of the power management term $P_D$ to the UE by the network via RRC signaling.

According to another embodiment, the minimum value for $P_{CMAX}$ may be set as follows:

$$P_{CMAX\_L} = \mathrm{MIN}\{P_{EMAX} - \Delta T_C, P_{PowerClass} - \mathrm{MPR-A-MPR} - P_D \Delta T_C\} \quad (7)$$

In this case, $P_D$ would typically depend on MPR and/or A-MPR, because the power reduction due to dual/multiple transmission is typically not cumulative with the power reductions required for MPR and A-MPR.

Returning to FIG. 3, after defining the range for the maximum output power, the UE 130 sets a maximum output power within the defined range. The setting may be performed according to any implementation specific method at the UE. For example, the UE may set the maximum output power to the mean of the range.

As will be appreciated, the above described embodiments apply to both a non-carrier aggregation scenario and a carrier aggregation scenario. In a carrier aggregation scenario, equations (4)-(7) apply to each carrier.

Figure 4:
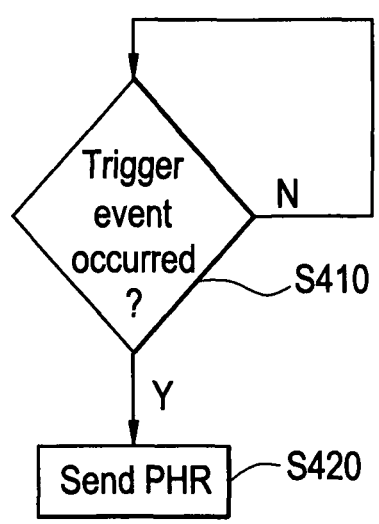
FIG. 4 illustrates a flow chart of a method of reporting power headroom.

FIG. 4 illustrates a flow chart of a method of reporting power headroom. As shown, in step S410, the UE 130 (e.g., the processing unit 240) determines if a triggering event has occurred. The triggering event may be one or more of the following:

reduction of Pcmax by a threshold, configPcmaxChange, due to the dual/multiple transmission.

a timer, prohibitPHRPcmax-Timer, expires or has expired and $P_{CMAX}$ changes more than configPcmaxChange due changes in the power management term $P_D$ the last transmission of a power headroom report (PHR).

a timer, prohibitPHRPdmax-Timer, expires or has expired and the power management term $P_D$ changes more than a threshold, configPdmaxChange, since the last transmission of a PHR.

the power management term $P_D$ changes.

Next, in step S420, the UE 130 sends the PHR to at least one of the base stations 110 and 120. The PHR includes information related to the maximum output power set in step 320. For example, the PHR includes information about the difference between nominal UE maximum transmit power, $P_{CMAX}$, and the estimated power of UL transmission. Additionally, the UE 130 may also transmit the management term $P_D$ and/or $P_{CMAX}$. MAC signalling may be used to signal $P_{CMAX}$ or $P_D$ to the network. The corresponding PHR for the UL transmission and/or the corresponding $P_{CMAX}$ and/or the corresponding management term $P_D$ are signalled to the network in the next available UL transmission. Also, after sending the PHR and/or the power management term $P_D$, the timer prohibitPHRPdmax-Timer may be reset.

In a special case of this embodiment, the threshold configPdmaxChange may be set to zero, so that signalling of the PHR and/or $P_D$ and/or $P_{CMAX}$ are triggered whenever $P_D$ changes. In a similar embodiment, the signalling of PHR and/or $P_D$ and/or $P_{CMAX}$ are triggered whenever $P_D$ changes. The corresponding PHR for the UL transmission and corresponding $P_D$ are signalled to the network in the next available UL transmission.

In another embodiment, instead of sending the power management term $P_D$ or in addition to, the actual power reduction due to dual/multiple transmission, $P_{D\text{-}actual}$ itself is signaled to the network (where $P_{D\text{-}actual} <= P_D$). Also, any of the triggering events described above with respect to the power management term $P_D$, may be based on the actual reduction $P_{D\text{-}actual}$.

As will be appreciated, the above described embodiments apply to both a non-carrier aggregation scenario and a carrier aggregation scenario. In a carrier aggregation scenario, the triggering events may be on a carrier-by-carrier basis. Still further, in the carrier aggregation scenario, a total per UE maximum transmit power $P_{UMAX}$ may be defined as the sum of the maximum output power for each carrier $P_{CMAX,C}$. Upon the reduction of $P_{UMAX}$ by a threshold, configPumaxChange, due to a change in the power management terms $P_{D,CS}$, the transmission of PHR and $P_{CMAX,C}$ is triggered for the corresponding activated carriers. A frequent PHR/$P_{CMAX,C}$ transmission due to the reduction of power resulting the power management terms $P_{D,CS}$ is controled by a configured timer prohibitPHRPumax-Timer. PHR/$P_{CMAX,C}$ transmission is triggered when prohibitPHRPumax-Timer expires or has expired and $P_{UMAX}$ changes more than configPumaxChange due to the power management terms $P_{D,CS}$ since the last transmission of a PHR. The corresponding PHR for the UL transmission and the corresponding $P_{CMAX,C}$ are signalled to the network in the next available UL transmission. The prohibitPHRPumax-Timer is restarted after transmission of PHR/$P_{CMAX,C}$.

According to another embodiment, the total per UE maximum transmit power $P_{UMAX}$, is reduced by $P_{DU}$. Signalling of the value of $P_{DU}$ and/or $P_{DU\text{-}actual}$ can be triggered by a change in $P_{DU}$ and/or $P_{DU\text{-}actual}$. In this case, $P_{CMAX,C}$ will be unaffected by $P_{DU\text{-}actual}$, and $P_{DU\text{-}actual}$ is only taken into account when scaling the sum of the $P_{CMAX,CS}$ down to keep less than or equal to $P_{UMAX}\text{-}P_{DU}$.

In the above embodiments where the management term $P_D$ represents the reduction in power due to dual/multiple transmission, and the management term $P_D$ or actual power reduction $P_{D\text{-}actual}$ are sent to the base station, the base station is provided with the cause of the power reduction. Namely, the base station is informed that power reduction occurred because of the dual/multiple transmission at the UE.

Figure 5:
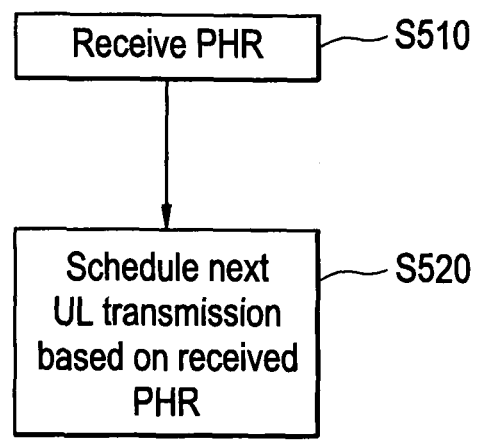
FIG. 5 illustrates a flow chart of a method of scheduling uplink transmission at a base station.

Next, a method of scheduling uplink transmission at a base station will be described. FIG. 5 illustrates a flow chart of a method of scheduling uplink transmission at a base station. As shown, in step S510, the base station (e.g., base station 110) receives the PHR from a UE. The base station may also receive $P_{CMAX}$ and/or $P_D$ and/or $P_{D\text{-}actual}$. It will also be appreciated that the base station may receive this information from a number of UE associated with the base station. Then in step S520, the base station schedule uplink transmission using the information received in step S510. The base station may perform this scheduling in any well-known manner.

The described embodiments provide a mechanism for informing the network (scheduler) of the reduction of transmission power due to, for example, dual/multiple transmission. By providing up-to-date information of available transmission power at the UE, the network may schedule the UE for appropriate transmission power, hence improving system performance. In addition, mismatch between network and the UE on power control, which leads to inaccuracy in channel estimation at the network, may by reduced or prevented.

The example embodiments being thus described, it will be obvious that the same may be varied in many ways. Such variations are not to be regarded as a departure from the invention, and all such modifications are intended to be included within the scope of the invention.

We claim:

1. A method of setting a maximum output power for user equipment, the method comprising:

defining, at the user equipment, a range for the maximum output power, the range including a maximum value and a minimum value, the minimum value being based on a maximum power signaled by a base station, a power class of the user equipment, a maximum power reduction permitted, an additional maximum power reduction permitted, a reduction term dependent on transmission bandwidth, and a power management term representing a limit on power reduction due to transmission on different radio access technologies by the user equipment; and setting, by the user equipment, the maximum output power within the defined range.

2. The method of claim 1, wherein the maximum power reduction permitted is based on modulation and transmit bandwidth configuration, and the additional maximum power reduction permitted is based on additional requirements for uplink transmission to the base station.

3. The method of claim 1, wherein the minimum value is selected as a minimum one of:

$$P_{EMAX} - \Delta T_C,$$

$$P_{PowerClass} - MPR - A\text{-}MPR - \Delta T_C,$$

$$P_{PowerClass} - P_D - \Delta T_C$$

where $P_{EMAX}$ is the maximum power signaled by a base station, $P_{PowerClass}$ is the power class of the user equipment, MPR is the maximum power reduction permitted, A-MPR is the additional maximum power reduction permitted, $\Delta T_C$ is the reduction term dependent on transmission bandwidth, and $P_D$ is the power management term.

4. A method of reporting power headroom, the method comprising:
setting, at a user equipment, a maximum output power within a defined range, the defined range including a maximum value and a minimum value, the minimum value being based on a maximum power signaled by a base station, a power class of the user equipment, a maximum power reduction permitted, an additional maximum power reduction permitted, a reduction term dependent on transmission bandwidth, and a power management term representing a limit on power reduction due to transmission on different radio access technologies by the user equipment; and
sending, by the user equipment, a power headroom report if at least one triggering event occurs, the power headroom report including information related to the set maximum output power.

5. The method of claim 4, wherein the maximum power reduction permitted is based on modulation and transmit bandwidth configuration, and the additional maximum power reduction permitted is based on additional requirements for uplink transmission to the base station.

6. The method of claim 4, wherein the minimum value is selected as a minimum one of:

$$P_{EMAX} - \Delta T_C,$$

$$P_{PowerClass} - MPR - A\text{-}MPR - \Delta T_C,$$

$$P_{PowerClass} - P_D - \Delta T_C$$

where $P_{EMAX}$ is the maximum power signaled by a base station, $P_{PowerClass}$ is the power class of the user equipment, MPR is the maximum power reduction permitted, A-MPR is the additional maximum power reduction permitted, $\Delta T_C$ is the reduction term dependent on transmission bandwidth, and $P_D$ is the power management term.

7. The method of claim 4, wherein one of the at least one triggering event includes conditions of,
expiration of a timer, and
a value of the management term has changed by greater than a threshold since a previous power headroom report was sent.

8. The method of claim 7, further comprising:
resetting the timer after sending the power headroom report.

9. The method of claim 4, wherein one of the at least one triggering event includes conditions of,
expiration of a timer, and
a value of the set maximum output power has changed by greater than a threshold since a previous power headroom report was sent because of a change in the management term.

10. The method of claim 9, further comprising:
resetting the timer after sending the power headroom report.

11. The method of claim 4, wherein the sending sends the set maximum power output.

12. The method of claim 4, wherein the sending sends the power management term.

13. The method of claim 4, wherein the sending sends an amount of the power reduction due to the power management term.

14. The method of claim 4, wherein the sending sends an indication of a reason for a power reduction at the user equipment.

15. A method of scheduling uplink transmission, the method comprising:
receiving, by a base station, a power headroom report from user equipment, the power headroom report including information related to a maximum output power set at the user equipment, the maximum output power being set within a defined range, the defined range including a maximum value and a minimum value, the minimum value being based on a maximum power signaled by the base station, a power class of the user equipment, a maximum power reduction permitted, an additional maximum power reduction permitted, a reduction term dependent on transmission bandwidth, and a power management term representing a limit on power reduction due to transmission on different radio access technologies by the user equipment; and
scheduling, by the base station, an uplink transmission by the user equipment based on the received power headroom report.

16. The method of claim 15, wherein the receiving receives at least one of the set maximum output power, the power management term, and an amount of the power reduction due to the power management term.

17. The method of claim 15, wherein the receiving receives an indication of a reason for the power reduction at the user equipment.

18. A user equipment, comprising:
a receiver unit configured to receive data;
a transmitting unit configured to transmit data;
a memory unit configured to store information; and
a processing unit coupled to the transmitting unit, the receiving unit, and the memory unit, the processing unit configured to,
define a range for the maximum output power, the range including a maximum value and a minimum value, the minimum value being based on a maximum power signaled by a base station, a power class of the user equipment, a maximum power reduction permitted, an additional maximum power reduction permitted, a reduction term dependent on transmission bandwidth, and a power management term representing a limit on power reduction due to transmission on different radio access technologies by the user equipment; and
set the maximum output power within the defined range.

19. A user equipment, comprising:
a receiver unit configured to receive data;
a transmitting unit configured to transmit data;
a memory unit configured to store information; and
a processing unit coupled to the transmitting unit, the receiving unit, and the memory unit, the processing unit configured to,
- set a maximum output power within a defined range, the defined range including a maximum value and a minimum value, the minimum value being based on a maximum power signaled by a base station, a power class of the user equipment, a maximum power reduction permitted, an additional maximum power reduction permitted, a reduction term dependent on transmission bandwidth, and a power management term representing power reduction due to transmission on a different radio access technologies by the user equipment; and
- send a power headroom report if a triggering event occurs, the power headroom report including information related to the set maximum output power.

* * * * *